United States Patent [19]

Wieder

[11] 4,153,840

[45] May 8, 1979

[54] DOUBLE CHAMBER IONIZATION SMOKE DETECTOR

[76] Inventor: Horst K. Wieder, 1207 Riverview La., Watertown, Wis. 53094

[21] Appl. No.: 754,276

[22] Filed: Dec. 27, 1976

Related U.S. Application Data

[63] Continuation-in-part of Ser. No. 592,028, Jun. 30, 1975.

[51] Int. Cl.[2] ........................ G01T 1/18; G01N 23/12

[52] U.S. Cl. .................................... 250/381; 250/385; 250/493

[58] Field of Search ......................... 250/381, 385, 493

[56] References Cited

U.S. PATENT DOCUMENTS 3,959,788 5/1976 Tipton et al. .................... 250/381 X 4,021,671 5/1977 Solomon .............................. 250/381

*Primary Examiner*—Archie R. Borchelt

[57] ABSTRACT

A combustion product detector comprises two ionization chambers with a radioactive source in each chamber. One chamber is vented to the ambient atmosphere and the other serves as a reference. A communicating passage is provided between the chambers. An adjustable target is provided in the reference chamber.

Test means to determine status of the device comprises a member having a conductive end which is normally in conductive relation with the vented electrode of the chamber. It may be manually depressed into the vented chamber against a biasing force to disconnect it.

Two radioactive sources are mounted in a holder which provides a window for each of the sources. In different embodiments the windows may be varied in size to vary the amount of radiation provided to each of the chambers independently without changing the parameters of the sources themselves.

7 Claims, 4 Drawing Figures

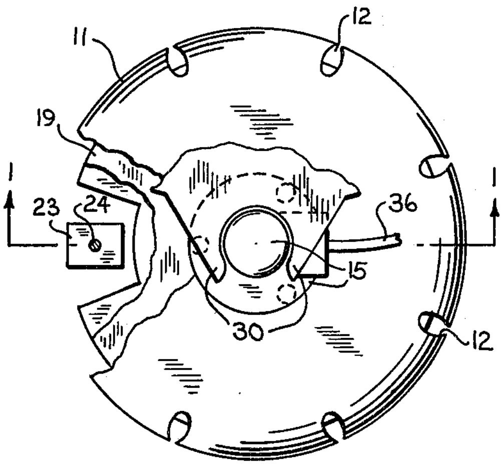
Fig. 2.
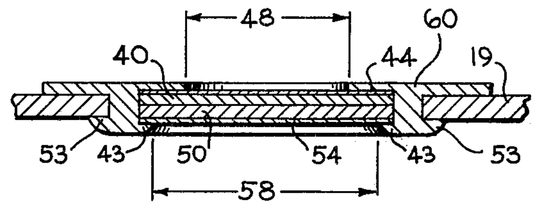
Fig. 3.
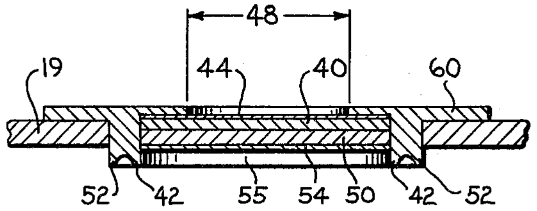
Fig. 4.
Fig. 1.
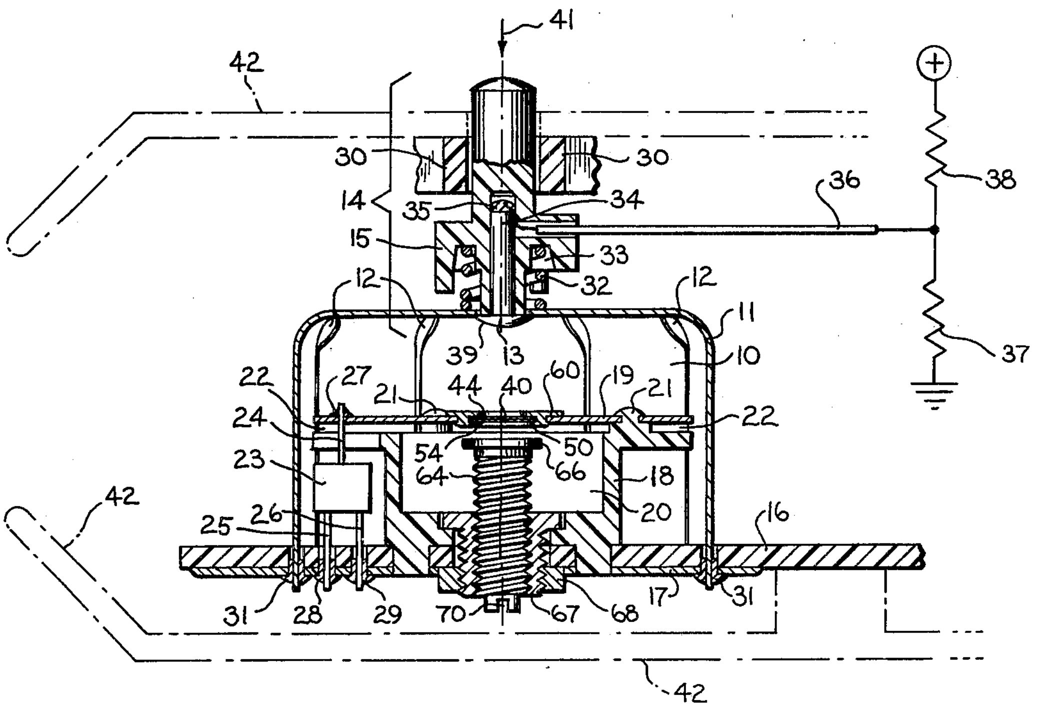

DOUBLE CHAMBER IONIZATION SMOKE DETECTOR

CROSS-REFERENCES

This application is a continuation-in-part application of application Ser. No. 592,028 filed June 30, 1975, entitled "COMBUSTION PRODUCT DETECTOR".

FIELD

This invention relates to a combustion product detector of the type having a measuring chamber and a reference chamber with a radioactive source in each to provide ionization in each so that drop in ionization current in the measuring chamber in response to the presence of combustion products therein provides a voltage change which may be referenced against the voltage drop of the reference chamber and may suitably be amplified to provide an alarm signal.

PRIOR ART

Devices which have been heretofore described for detecting smoke or other combustion products and emitting an alarm signal in response to the presence thereof, wherein an ionization chamber has been provided and a radioactive source has been provided in the ionization chamber to ionize the gas in the chamber, have generally been of two types: those in which two chambers are provided, smoke and other combustion products being admitted only to one chamber and the other chamber serving as a reference for the first chamber, and those in which only one chamber is provided. The present device is of the type wherein two chambers are provided and wherein a separate radioactive source is provided for each chamber.

A characterizing feature of the instant invention is that a communicating passage is provided between the two chambers. All other known disclosures which show two chambers provide the reference chamber sealed from the ambient atmosphere and from communication with the measuring chamber to which the atmosphere is admitted except for the following: Tomioka U.S. Pat. Nos. 3,935,466 (1976); Sasaki et al. 3,935,492 (1976); and Nahmias 2,981,840 (1961) but these patents are not pertinent because they disclose two chambers with but a single radioactive source and therefore provision of a communicating passage between the two chambers is a matter of critical necessity in these devices in order to provide for radioactivity from a single source to enter both chambers, in contradistinction to the structure of the instant device.

The following patents show combustion product detectors of the ionization type in which measuring chamber and reference chamber are provided, each chamber being provided with a separate radioactive source, mounted more or less coaxially or in a generally back-to-back relation. Each of these patents with the exception of Crawford et al. and perhaps the Scheidweiler et al. patent utilize a field effect transistor as does the instant device: Beyersdorf U.S. Pat. Nos. 3,963,929 (1976); Lampart et al. 3,767,917 (1973); Scheidweiler et al. 3,681,603 (1972); Kobayashi 3,676,681 (1972); Abe 3,500,368 (1970); and Bressler 3,078,450 (1963). None of these patents however show the claimed structures relating to the mounting of the radioactive sources, the test member, the communicating passage between chambers and the target structure, each of which is a characterizing feature of the instant device.

These patents show an adjustable target in the reference chamber which differs in structure from that of the present device: Tipton et al. 3,959,788 (1976) and Crawford et al. 3,271,756 (1966).

SUMMARY

To provide a target venting electrode for the measurement chamber of the combustion product detector of the invention to vent the ambient atmosphere to the chamber a flat blank may first be blanked out of a suitable conductive material such as beryllium-copper or the like, the blank being provided with petal-like radially extending portions. The blank may then be formed as by drawing or stamping into a domelike member which may then be attached to a printed circuit board. Mounted on the printed circuit board within the chamber thus provided there may be a plastic housing for the reference chamber, a target for the reference chamber and an FET as hereinbelow described. Vents to admit smoke and other combustion products to the measurement ionization chamber are provided by the spaces between the petal-like portions after stamping. The venting electrode is connected to a layer of conductive material on the PC (printed circuit) board so that the sensitive parts inside the chamber, namely the radioactive sources for both chambers and the FET and its leads are effectively shielded. A test member is admitted into an aperture in the venting electrode with an end of electrically conductive material which electrically contacts the electrode. The member is mounted so that manually depressing it by pushing one end of the member which serves as a test button forces the test member into the chamber against the biasing action of a spring and disconnects it from the electrode.

The electrically conductive end is preferably normally maintained at a preselected voltage through a voltage divider.

Means are provided to mount the radioactive sources for the vented measurement chamber and the reference chamber so that for different embodiments the sources need not be changed and the divider plate in which the source holder member is mounted also need not be changed. Different source holder mounting members may be provided with different windows for each of the sources so that the radioactivity provided by identical sources is different for the measurement chamber and for the reference chamber by providing a wider window for the reference chamber and a narrower window for the other chamber. Thus the sources themselves may be identical and no precautions need be observed in inventorying or assembling to make sure that a distinction is made between the sources used for the two chambers.

It has been found desirable to provide a communicating passage between the measurement chamber and the reference chamber. By providing such a passage, an extremely slow accumulation of combustion products such as may be provided by ordinary smoking activities or cooking activities provides equivalent atmospheres in both chambers and consequently no differential voltage is provided and false alarm is not given.

In order to provide adjustment for the reference chamber, the target for the reference chamber is provided as an adjustable member.

The device may optionally be powered either with AC line current or with a battery and if powered with AC current may be provided with a standby battery and with automatic switching to the standby battery in the event of AC current failure.

The device may also be optionally provided with a circuit which responds to impairment of the power supply such as low battery voltage, battery short, absence of battery, AC current failure and the like by actuating the same alarm device as may be actuated by the detection of combustion products. An oscillator may be part of the circuit to provide a repeating signal as contrasted with the steady alarm signal provided in response to the presence of combustion products and the value of the elements in the circuit may be selected to preselect the intervals between the repetitive signals.

OBJECTS

It is therefore an object of the invention to provide an improved combustion products detector of the type utilizing two radioactive sources and two ionization chambers.

It is a further object to provide improved means to test such a device to determine its functionality without changing any electrical value or parameter in the circuitry associated therewith.

It is a further object to provide improved means to mount the radioactive sources in such a device.

Another object is such a device having a reduced tendency to provide a false alarm in response to products from such activities as cooking and smoking.

Another object is such a device wherein the parameters of the reference chamber may readily be adjusted to a desired value and may then be maintained at such value with minimum drift.

Further objects will become apparent from the drawings and from the following detailed description.

DRAWINGS

In the drawings like reference numerals refer to like parts and:

FIG. 1 is a cross-sectional elevation;

FIG. 2 is a fragmentary partially cutaway plan view;

FIG. 3 is an enlarged view of a portion of FIG. 1; and

FIG. 4 is a view corresponding to that of FIG. 3 of the parts of FIG. 3 prior to final assembly.

DESCRIPTION

Referring now to FIGS. 1, 2 and 3, a first ionization chamber 10 may serve as a measurement chamber and may be defined by electrode 11 having vents 12 therein and by an electrically conductive portion 13 of test member which is indicated generally as 14 and may have non-conductive portion 15 preferably made of any suitable polymeric synthetic resinous material and by conductive layer 17 on the lower surface of printed circuit board 16 as shown. Attached to printed circuit board 16 there may be provided housing member 18 preferably of plastic which together with divider plate 19 (which may be attached to housing member 18 as by staking at 21) may define a reference chamber 20. Space 22 may be provided between members 19 and 18 to permit passage of gas from chamber 10 to chamber 20 for the purpose of permitting conditions in chamber 20 to equalize with conditions in chamber 10 so that if combustion products of activity such as cooking and smoking enter chamber 10 and slowly change the conditions in chamber 10, conditions in chamber 20 after a few minutes are similar and a false alarm is not provided in response to such activity.

Electrode 11 coacting with layer 17 effectively entirely shields the portions defining chamber 20 and the radioactive sources hereinafter described and the field effect transistor(FET) 23 and its electrodes 24, 25 and 26 connected respectively at 27, 28 and 29 to divider plate 19 and to layer 17. In conjunction with the FET other circuit elements, such as an integrated circuit chip, may be provided.

Venting electrode 11 is connected to layer 17 as by soldering at 31. Test member 14 may be slidably received between mounting fingers 30 as described in parent application Ser. No. 592,028 and may be biased upwardly away from venting electrode 11 by means such as spring means 32 acting between electrode 11 and recess 33 provided in member 14. Electrically conductive portion 13 at one end of member 14 may comprise the head of a shanked member such as a rivet having shank 34 which may be connected as by soldering at 35 to a lead 36 which may be connected to ground as shown through resistor 37. Portion 13 may be connected with B+ as shown through resistor 38 thence through lead 36 and may be connected to ground through resistor 37. Portion 13 is in electrical connection with peripheral portion of aperture 39 provided in electrode 11 to receive member 14. Thus a static charge build-up on non-conductive portion 15 is prevented from affecting the voltage of member 11 or the ionization in chamber 10.

When member 14 is depressed as by applying finger pressure in the manner indicated by arrow 41, portion 13 is electrically disconnected from member 11. The voltage applied to portion 13 from the voltage divider comprising resisters 37 and 38 may be made such that such disconnection produces an alarm situation to meet desired specifications for the device.

The entire device may be mounted within a housing as indicated by dashed lines 42.

Radioactive source to provide ionization in chamber 10 may comprise a plate 40 having a coating 44 of radioactive material thereon. A radioactive source to provide ionization within chamber 20 may comprise a plate member 50 having a coating 54 of radioactive material thereon. Plate 50 and layer 54 may be identical with plate 40 and layer 44. Plates 40 and 50 may be received in a recess 55 in a source holder indicated generally as 60. Member 60 may be provided with a stakable portion at 42 and stakable portion at 52 whereby plates 40 and 50 may be retained in recess 55 by staking of portion 42 as indicated at 43. Member 60 may be retained in divider plate 19 by staking of portion 52 as indicated at 53. Thus a first aperture 48 having a diameter as indicated at 48 is provided adjacent layer 44 to determine the amount of radioactive rays emitted from layer 44 and likewise an aperture indicated as having diameter 58 is provided to control the amount of radiation emitted from layer 54 into chamber 20. Thus, since it is preferred to provide more radiation in chamber 20 then in chamber 10, diameter 58 may be made greater than diameter 48 and consequently while using source plates and source layers on said plates which are identical, radiation from such identical sources may be made different for each of the chambers. Consequently in the course of inventorying parts and subsequently assembling the parts no distinction need be made between sources for chamber 10 and sources for chamber 20 since these parts are very small and making such distinctions between them is difficult and costly. Appreciable saving is thus realized.

In order to provide for ready adjustment of the parameters of chamber 20, a threaded target member 64 may have a broadened top 65 and a slot 66 to receive a screw driver. Member 64 may be threadedly received in threaded target holding member 67 may be retained in place and may serve to attach members 18 and 16 together by having nut 68 threadedly received thereon.

It will be apparent to those skilled in the art that equivalents may be utilized.

Accordingly, the present invention may be embodied in other specific forms without departing from the spirit or essential attributes thereof, and accordingly, reference should be made to the appended claims rather than to the foregoing specification as indicating the scope of the invention.

It is claimed:

1. In a combustion product detector comprising two radioactive sources and two ionization chambers each comprising an electrode, one of said chambers being vented to the ambient atmosphere through one of said electrodes and the other chamber adapted to serve as a reference and substantially partially surrounded by said venting electrode, the combination characterized by:

a passage communicating between said chambers to permit gas to pass from said chamber comprising said venting electrode to said reference chamber, said passage characterized by being an annular passage extending substantially entirely around said radioactive sources.

2. In a combustion product detector comprising two radioactive sources and two ionization chambers each comprising an electrode, one of said chambers being vented to the ambient atmosphere through one of said electrodes and the other chamber adapted to serve as a reference and substantially partially surrounded by said venting electrode, the combination characterized by: p1 said venting electrode provided with an aperture to receive a test member, and a test member comprising an electrically non-conductive portion and an electrically conductive portion, said test member supported to extend through said aperture into said vented chamber to provide said electrically conductive portion substantially inside said chamber and said electrically non-conductive portion substantially outside said chamber with said electrically conductive portion in electrical contact with said venting electrode, biasing means providing a biasing force to bias said test member away from said venting electrode, said test member manually moveable against said biasing force to extend further into said chamber to produce a change in the ionization current in said chamber, said electrically conductive portion being grounded through a resistor.

3. The device of claim 2 wherein said non-conductive portion is plastic and said electrically conductive portion is a member comprising a shank and a rivet and said shank is received in interfering relation in a recess in said plastic of said non-conductive portion and said head engages said venting electrode to prevent removal of said head from said chamber in response to said biasing force.

4. In a combustion product detector comprising two radioactive sources and two ionization chambers each comprising an electrode, one of said chambers being vented to the ambient atmosphere through one of said electrodes and the other chamber adapted to serve as a reference and substantially partially surrounded by said venting electrode, the combination characterized by:

said two sources each consisting of radioactive material deposited on a surface of a plate member, a source holder member comprising a shouldered recess, said plate members received in said shouldered recess with said sources disposed to radiate in opposite directions, said plate members retained in said recess by staked portions of said source holder member, said recess adapted to be provided with different apertures through which rays may be emitted from each of said sources whereby amounts of radiation emitted to each of said chambers may be varied by providing holder members having such apertures of different sizes without changing the dimensions of said plates or the characteristics of said deposited radioactive material.

5. The device of claim 4 wherein a divider plate member is provided to separate and define portions of said chambers, said divider member is provided with an aperture, and said source holder member is received in said recess and is retained therein by staked portions of said holder member.

6. The device of claim 5 wherein said divider plate member extends laterally within said venting electrode and the peripheral edges of said divider plate member are spaced slightly apart from said venting electrode.

7. The device of claim 5 wherein a plastic housing member serves with said divider plate member to define said reference chamber, a threaded target electrode to receive a principal portion of the radiation emitted by said source in said reference chamber, said target electrode extending through said plastic housing member, said target electrode selectively positionable at varying distances from said source, a base plate member, a threaded electrode retaining member, said electrode retaining member through said base plate member and said plastic housing member and retained in place by a nut threadedly received thereon, said target electrode threadedly received in said electrode retaining member.

* * * * *